(12) United States Patent
Wilkins (10) Patent No.: US 9,069,475 B1
(45) Date of Patent: Jun. 30, 2015

(54) HYBRID DRIVE SELECTIVELY SPINNING UP DISK WHEN POWERED ON

(75) Inventor: Virgil V. Wilkins, Perris, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 471 days.

(21) Appl. No.: 12/912,662

(22) Filed: Oct. 26, 2010

(51) Int. Cl.
*G06F 13/00* (2006.01)
*G06F 13/28* (2006.01)
*G06F 3/06* (2006.01)

(52) U.S. Cl.
CPC .......... *G06F 3/0625* (2013.01); *G06F 3/0634* (2013.01); *G06F 3/068* (2013.01)

(58) Field of Classification Search
CPC ...... G06F 3/0625; G06F 3/0634; G06F 3/068
USPC .............. 711/112, 103, E12.002; 713/1
See application file for complete search history.

(56) References Cited

U.S. PATENT DOCUMENTS

| | | |
|---|---|---|
| 5,333,138 A | 7/1994 | Richards et al. |
| 5,581,785 A | 12/1996 | Nakamura et al. |
| 5,586,291 A | 12/1996 | Lasker et al. |
| 6,044,439 A | 3/2000 | Ballard et al. |
| 6,115,200 A | 9/2000 | Allen et al. |
| 6,275,949 B1 | 8/2001 | Watanabe |
| 6,429,990 B2 | 8/2002 | Serrano et al. |
| 6,661,591 B1 | 12/2003 | Rothberg |
| 6,662,267 B2 | 12/2003 | Stewart |
| 6,687,850 B1 | 2/2004 | Rothberg |
| 6,754,021 B2 | 6/2004 | Kisaka et al. |
| 6,785,767 B2 | 8/2004 | Coulson |
| 6,807,630 B2 | 10/2004 | Lay et al. |
| 6,856,556 B1 | 2/2005 | Hajeck |
| 6,909,574 B2 | 6/2005 | Aikawa et al. |
| 6,920,533 B2 | 7/2005 | Coulson et al. |
| 6,968,450 B1 | 11/2005 | Rothberg et al. |
| 7,017,037 B2 | 3/2006 | Fortin et al. |
| 7,028,174 B1 | 4/2006 | Atai-Azimi et al. |
| 7,082,494 B1 | 7/2006 | Thelin et al. |
| 7,107,444 B2 | 9/2006 | Fortin et al. |
| 7,120,806 B1 | 10/2006 | Codilian et al. |
| 7,126,857 B2 | 10/2006 | Hajeck |
| 7,142,385 B2 | 11/2006 | Shimotono et al. |
| 7,334,082 B2 | 2/2008 | Grover et al. |
| 7,395,452 B2 | 7/2008 | Nicholson et al. |
| 7,411,757 B2 | 8/2008 | Chu et al. |
| 7,430,136 B2 | 9/2008 | Merry, Jr. et al. |
| 7,447,807 B1 | 11/2008 | Merry et al. |
| 7,454,653 B2 | 11/2008 | Nicholson et al. |

(Continued)

OTHER PUBLICATIONS

Gokul Soundararajan, Vijayan Prabhakaran, Mahesh Balakrishan, Ted Wobber, "Extending SSD Lifetimes with Disk-Based Write Caches", http://research.microsoft.com/pubs/115352/hybrid.pdf, Feb. 2010.

(Continued)

*Primary Examiner* — Edward Dudek, Jr.

(57) ABSTRACT

A hybrid drive is disclosed comprising a head actuated over a disk, and a non-volatile semiconductor memory (NVSM). When booting the hybrid drive in a first boot mode, the disk remains spun down, and when booting in a second boot mode, the disk is spun up. In one embodiment the hybrid drive receives a host command that configures the boot mode, and in another embodiment the hybrid drive determines the boot mode based on a state of the NVSM, such as an amount of free space or life remaining of the NVSM.

6 Claims, 5 Drawing Sheets

(56) References Cited

U.S. PATENT DOCUMENTS

| | | | |
|---|---|---|---|
| 7,461,202 B2 | 12/2008 | Forrer, Jr. et al. |
| 7,469,336 B2 | 12/2008 | Choo |
| 7,472,222 B2 | 12/2008 | Auerbach et al. |
| 7,477,477 B2 | 1/2009 | Maruchi et al. |
| 7,502,256 B2 | 3/2009 | Merry, Jr. et al. |
| 7,509,441 B1 | 3/2009 | Merry et al. |
| 7,509,471 B2 | 3/2009 | Gorobets |
| 7,516,346 B2 | 4/2009 | Pinheiro et al. |
| 7,596,643 B2 | 9/2009 | Merry, Jr. et al. |
| 7,610,438 B2 | 10/2009 | Lee et al. |
| 7,613,876 B2 | 11/2009 | Bruce et al. |
| 7,620,784 B2 | 11/2009 | Panabaker |
| 7,644,231 B2 | 1/2010 | Recio et al. |
| 7,653,778 B2 | 1/2010 | Merry, Jr. et al. |
| 7,685,337 B2 | 3/2010 | Merry, Jr. et al. |
| 7,685,338 B2 | 3/2010 | Merry, Jr. et al. |
| 7,685,360 B1 | 3/2010 | Brunnett et al. |
| 7,685,374 B2 | 3/2010 | Diggs et al. |
| 7,733,712 B1 | 6/2010 | Walston et al. |
| 7,752,491 B1 | 7/2010 | Liikanen et al. |
| 7,765,373 B1 | 7/2010 | Merry et al. |
| 7,898,855 B2 | 3/2011 | Merry, Jr. et al. |
| 7,912,991 B1 | 3/2011 | Merry et al. |
| 7,936,603 B2 | 5/2011 | Merry, Jr. et al. |
| 7,962,792 B2 | 6/2011 | Diggs et al. |
| 8,078,918 B2 | 12/2011 | Diggs et al. |
| 8,090,899 B1 | 1/2012 | Syu |
| 8,095,851 B2 | 1/2012 | Diggs et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,243,525 B1 | 8/2012 | Kan |
| 8,254,172 B1 | 8/2012 | Kan |
| 8,261,012 B2 | 9/2012 | Kan |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 8,909,889 B1 | 12/2014 | Ong et al. |
| 2002/0156970 A1 | 10/2002 | Stewart |
| 2004/0210848 A1* | 10/2004 | Vineyard, Jr. et al. ........ 715/810 |
| 2005/0251617 A1 | 11/2005 | Sinclair et al. |
| 2006/0195657 A1 | 8/2006 | Tien et al. |
| 2006/0248387 A1* | 11/2006 | Nicholson et al. ............. 714/22 |
| 2006/0294357 A1* | 12/2006 | Choo ............................... 713/2 |
| 2007/0186039 A1 | 8/2007 | Nam |
| 2008/0040537 A1 | 2/2008 | Kim |
| 2008/0059694 A1 | 3/2008 | Lee |
| 2008/0130156 A1 | 6/2008 | Chu et al. |
| 2008/0177938 A1 | 7/2008 | Yu |
| 2008/0222353 A1* | 9/2008 | Nam et al. .................... 711/113 |
| 2008/0256287 A1 | 10/2008 | Lee et al. |
| 2008/0307270 A1 | 12/2008 | Li |
| 2009/0019218 A1 | 1/2009 | Sinclair et al. |
| 2009/0031072 A1 | 1/2009 | Sartore |
| 2009/0083558 A1* | 3/2009 | Sugiki et al. .................. 713/320 |
| 2009/0087168 A1* | 4/2009 | Park et al. ...................... 386/124 |
| 2009/0103203 A1 | 4/2009 | Yoshida |
| 2009/0106518 A1 | 4/2009 | Dow |
| 2009/0144501 A2 | 6/2009 | Yim et al. |
| 2009/0150599 A1 | 6/2009 | Bennett |
| 2009/0172324 A1 | 7/2009 | Han et al. |
| 2009/0249168 A1 | 10/2009 | Inoue |
| 2009/0271562 A1 | 10/2009 | Sinclair |
| 2009/0327603 A1 | 12/2009 | Mckean et al. |
| 2010/0088459 A1 | 4/2010 | Arya et al. |
| 2010/0174849 A1 | 7/2010 | Walston et al. |
| 2010/0195463 A1* | 8/2010 | Kurashige et al. ......... 369/53.45 |
| 2010/0250793 A1 | 9/2010 | Syu |
| 2011/0099323 A1 | 4/2011 | Syu |
| 2011/0283049 A1 | 11/2011 | Kang et al. |
| 2012/0260020 A1 | 10/2012 | Suryabudi et al. |
| 2012/0278531 A1 | 11/2012 | Horn |
| 2012/0284460 A1 | 11/2012 | Guda |
| 2012/0324191 A1 | 12/2012 | Strange et al. |
| 2013/0132638 A1 | 5/2013 | Horn et al. |
| 2013/0145106 A1 | 6/2013 | Kan |
| 2013/0290793 A1 | 10/2013 | Booth et al. |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0223255 A1 | 8/2014 | Lu et al. |

OTHER PUBLICATIONS

Tao Xie, Deepthi Madathil, "SAIL: Self-Adaptive File Reallocation on Hybrid Disk Arrays", The 15th Annual IEEE International Conference on High Performance Computing (HiPC 2008), Bangalore, India, Dec. 17-20, 2008.

Non-Volatile Memory Host Controller Interface revision 1.0 specification available for download at http://www.intel.com/standards/nvmhci/index.htm. Ratified on Apr. 14, 2008, 65 pages.

U.S. Appl. No. 12/720,568, filed Mar. 9, 2010, 22 pages.

H. Payer, et al., "Combo Drive: Optimizing Cost and Performance in a Heterogeneous Storage Device", In Proc. Workshop on Integrating Solid-state Memory into the Storage Hierarchy (WISH), Mar. 2009, http://csl.cse.psu.edu/wish2009_papers/Payer.pdf, 8 pages.

Xiaojian Wu, A. L. Narasimha Reddy, "Managing Storage Space in a Flash and Disk Hybrid Storage System", IEEE Mascots Conference, Sep. 21-23, 2009, 4 pages.

Hannes Payer, Marco A.A. Sanvido, Zvonimir Z. Bandic, Christoph M. Kirsch, "Combo Drive: Optimizing Cost and Performance in a (56) References Cited

OTHER PUBLICATIONS

Heterogeneous Storage Device", http://csl.cse.psu.edu/wish2009_papersl Payer.pdf; 2009.

Xiaojian Wu, A. L. Narasimha Reddy, "Managing Storage Space in a Flash and Disk Hybrid Storage System", http://www.ee.tamu.edu/~reddy/papers/mascots09.pdf; 2009.

* cited by examiner

HYBRID DRIVE SELECTIVELY SPINNING UP DISK WHEN POWERED ON

BACKGROUND

Hybrid drives are conventional disk drives augmented with a non-volatile semiconductor memory (NVSM) such as a flash which helps improve certain aspects of the disk drive. For example, the non-volatile semiconductor memory may store boot data in order to expedite the boot operation of a host computer. Another use of a NVSM may be to store frequently accessed data and/or non-sequential data for which the access time is typically much shorter than the disk (which suffers from mechanical latency including seek and rotational latency). Other policies may reduce write amplification of the NVSM in order to maximize its longevity, such as storing frequently written data to the disk (or data having a write/read ratio that exceeds a predetermined threshold).

DETAILED DESCRIPTION OF EMBODIMENTS OF THE INVENTION

Figures 1A, 1B:
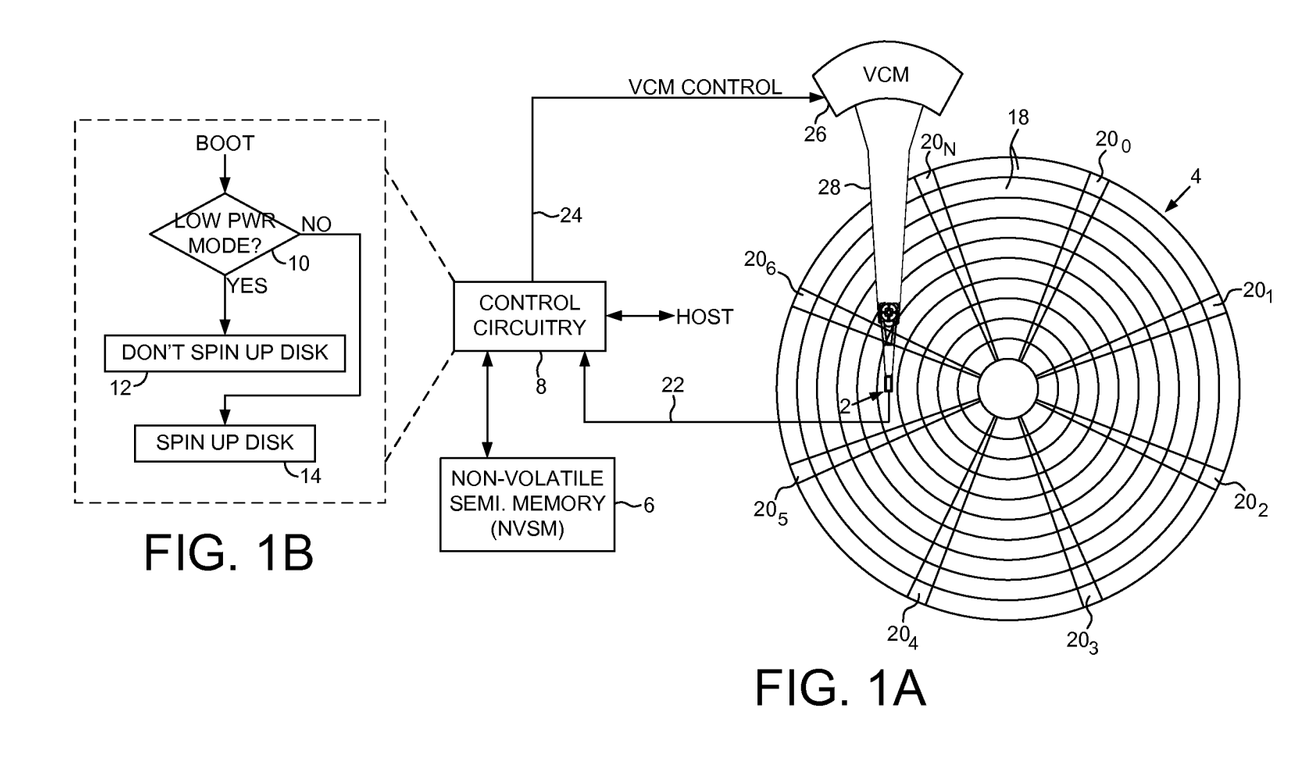
FIG. 1A shows a hybrid drive according to an embodiment of the present invention comprising a head actuated over a disk and a non-volatile semiconductor memory.
FIG. 1B is a flow diagram according to an embodiment of the present invention wherein the hybrid drive boots in a first mode wherein the disk remains spun down, or in a second mode wherein the disk is spun up.

FIG. 1A shows a hybrid drive according to an embodiment of the present invention comprising a head 2 actuated over a disk 4, and a non-volatile semiconductor memory (NVSM) 6. The hybrid drive further comprises control circuitry 8 operable to execute the flow diagram of FIG. 1B, wherein when booting the hybrid drive (step 10) in a first boot mode, the disk remains spun down (step 12), and when booting in a second boot mode, the disk is spun up (step 14).

In the embodiment of FIG. 1A, any suitable NVSM 6 may be employed, such as any suitable electrically erasable/programmable memory (e.g., a flash memory). In one embodiment, the NVSM comprises a plurality of blocks, where each block comprises a plurality of memory segments referred to as pages and each page may store one or more data sectors. The blocks are programmed a page at a time, and an entire block is erased in a unitary operation. In one embodiment, a garbage collection operation may be executed on previously written blocks in order to copy valid pages to new blocks (and/or to the disk) so that the previously written blocks may be erased and re-used.

The disk 4 shown in the embodiment of FIG. 1A comprises a plurality of servo sectors $20_0$-$20_N$ that define data tracks 18, where each data track comprises a plurality of the data sectors. The control circuitry 8 processes a read signal 22 emanating from the head 2 to demodulate the servo sectors $20_0$-$20_N$ into a position error signal (PES) representing a position error of the head relative to a target data track. The control circuitry 8 comprises a servo compensator for filtering the PES to generate a control signal 24 applied to a voice coil motor (VCM) 26 that rotates an actuator arm 28 about a pivot in order to actuate the head 2 radially over the disk 4 in a direction that reduces the PES.

When booting the hybrid drive of FIG. 1A, it may be desirable to keep the disk spun down, for example, to save power. In one embodiment, boot data (e.g., an operating system) for a host may be stored in the NVSM so that when the host needs to boot from the hybrid drive, the boot data is transferred from the NVSM while the disk remains spun down. The boot data may also include application data that a user typically accesses after booting the host. In this embodiment, the disk may remain spun down for an extended period while serving host accesses commands using the NVSM. The hybrid drive may be configured into the desired boot mode using any suitable technique, including an embodiment where the host configures the boot mode for the hybrid drive, or an embodiment where the control circuitry within the hybrid drive configures the boot mode, for example, based on a state of the NVSM.

Figure 2A:
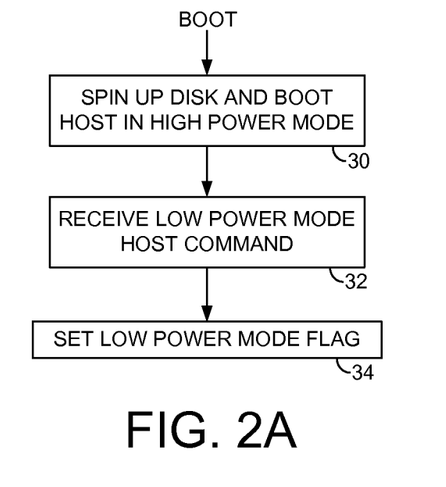
FIG. 2A is a flow diagram according to an embodiment of the present invention wherein the hybrid drive is configured by a host to boot in one of the first or second modes.

FIG. 2A is a flow diagram according to an embodiment of the present invention wherein the hybrid drive may be initially configured to boot by spinning up the disk in a high power mode (step 30). The hybrid drive may then receive a host command (step 32) to configure the boot mode of the hybrid drive into a low power mode wherein the control circuitry configures a corresponding data structure (e.g., sets a flag) that is stored in the NVSM (step 34). When the hybrid drive boots again, the control circuitry evaluates the data structure stored in the NVSM to determine the boot mode (i.e., whether to spin up the disk).

In one embodiment, the host may configure the hybrid drive into one of a number of different power modes, wherein the hybrid drive may control the spin up of the disk according to each power level. For example, in the lowest power mode the control circuitry may keep the disk spun down, for the next lowest power mode the control circuitry may spin up the disk to less than full speed, and so on until the control circuitry spins up the disk to the highest speed when configured in a high power mode. In one embodiment after spinning up the disk in a low speed mode, the control circuitry may increase the spin speed to service a host command (i.e., the disk may not be accessible at the lower spin speed). In another embodiment, the disk may still be accessible when spinning at the lower speed, wherein the data rate is lower which reduces power consumption.

Figure 2B:
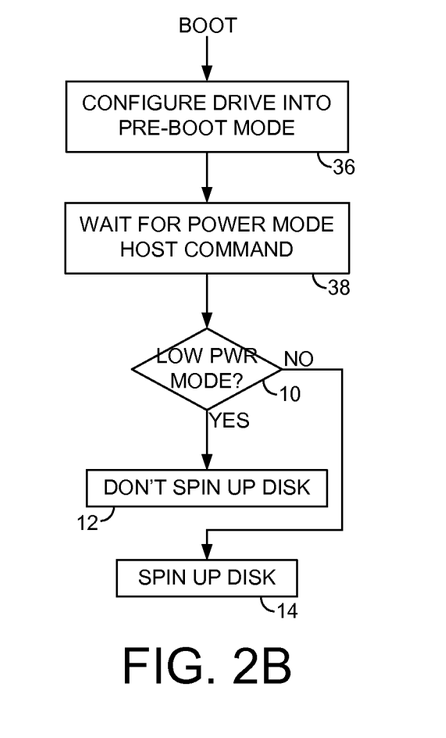
FIG. 2B is a flow diagram according to an embodiment of the present invention wherein the hybrid drive enters a preboot mode in order to receive a host command to continue booting in one of the first or second modes.

FIG. 2B is a flow diagram according to an embodiment of the present invention wherein when the hybrid drive is booted, the control circuitry configures the drive into a preboot mode (step 36) to reach a state where communication with a host is possible. The control circuitry then receives a power mode command from the host (step 38) which determines the boot mode for the hybrid drive (i.e., whether to spin up the disk). In one embodiment, the host may execute a Basic Input/Output System (BIOS) during its boot operation, wherein the BIOS may include instructions for configuring the boot mode of the hybrid drive. The BIOS may also include the ability to determine the desired power mode of the host system (e.g., whether operating on battery power) so that the hybrid drive can be configured accordingly during the host boot operation. In another embodiment, the hybrid drive may be deployed in an enterprise storage system (e.g., as part of a RAID storage system), wherein the storage controller may transmit a power mode to the hybrid drive during the boot operation of the storage system.

Figure 3A:
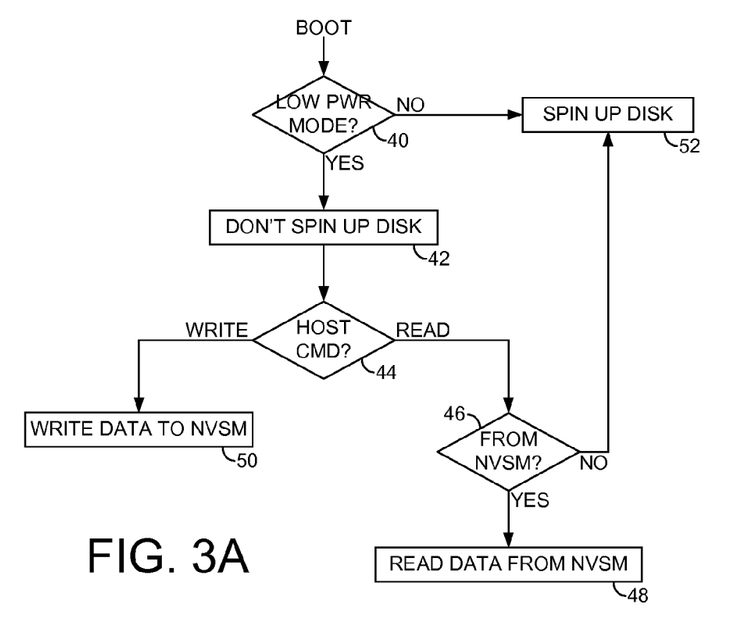
FIG. 3A is a flow diagram according to an embodiment of the present invention wherein when booting with the disk spun down write commands are serviced by the NVSM.

In another embodiment illustrated in the flow diagram of FIG. 3A, when the control circuitry boots the hybrid drive in low power mode (step 40) so that the disk remains spun down (step 42), and a host read command is received (step 44), when the read command can be serviced using the NVSM (step 46) the data is read from the NVSM without spinning up the disk (step 48). If a host write command is received (step 44), the write command is serviced by writing the data to the NVSM so that the disk can remain spun down (step 50). If a host read command is received (step 44) and the data is not stored in the NVSM (step 46), then the disk is spun up (step 52) so that the data can be read from the disk. Accordingly, in this embodiment the disk may remain spun down after the boot operation until a host command is received to read data from the disk.

Figure 3B:
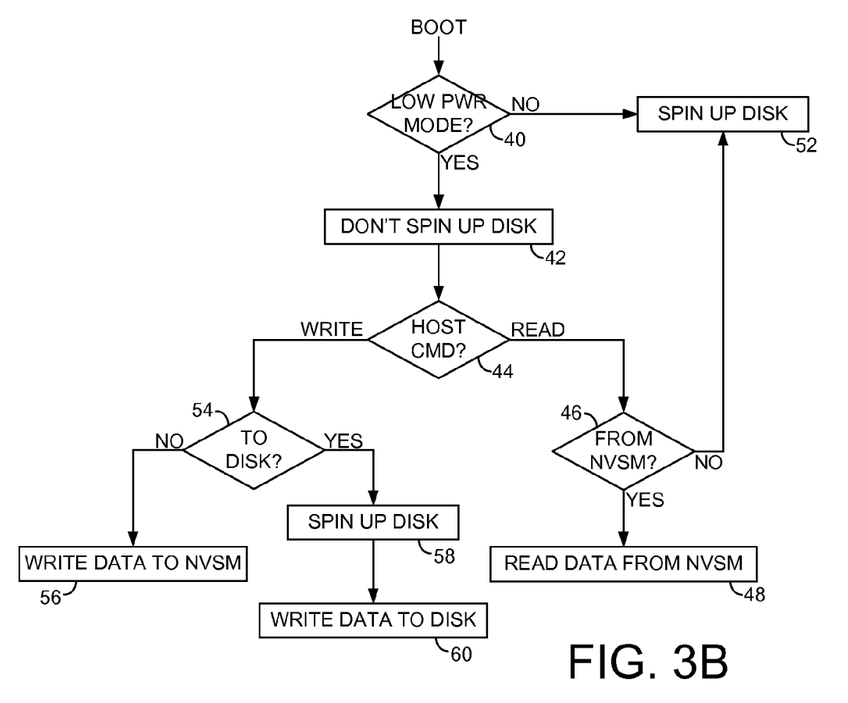
FIG. 3B is a flow diagram according to an embodiment of the present invention wherein when booting with the disk spun down the disk is spun up when a write command is received that is targeted to the disk.

FIG. 3B is a flow diagram that extends on the flow diagram of FIG. 3A, wherein when a write command is received from the host (step 44) while the disk is spun down, a decision is made (step 54) as to whether to service the write command using the NVSM (step 56), or whether to spin up the disk (step 58) and write the data to the disk (step 60). In one embodiment, the control circuitry may execute a suitable migration policy to determine where to write the data, for example, based on a write/read ratio as well as a read frequency of the data. Frequently read data (that is not frequently written) may be targeted to the NVSM whereas less frequently read (or frequently written) data may be targeted to the disk. In another embodiment, write commands comprising long sequences of consecutive logical block addresses (LBAs) may be serviced by the disk whereas write commands comprising random LBAs may be serviced by the NVSM. In one embodiment, when the disk is spun down the control circuitry biases the migration policy so that write commands are more likely serviced by the NVSM. However, the biased migration policy may still route a write command to the disk (e.g., if the write command comprises a long consecutive sequence of LBAs), in which case the disk is spun up.

Figure 4A:
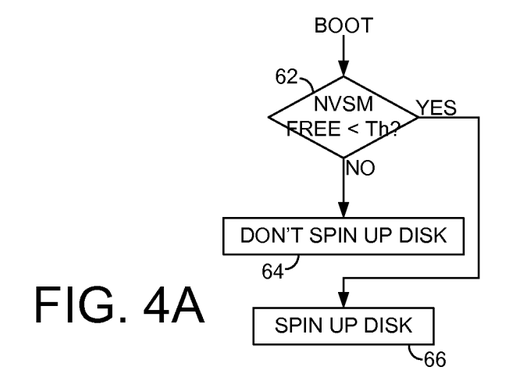
FIG. 4A is a flow diagram according to an embodiment of the present invention wherein the hybrid drive boots in the second mode (and spins up the disk) when the free space in the NVSM falls below a threshold.

In one embodiment, the control circuitry of the hybrid drive determines the boot mode (i.e., whether to spin up the disk) based on a state of the NVSM. FIG. 4A is a flow diagram of an embodiment where the control circuitry evaluates the amount of free space available in the NVSM at the beginning of the boot operation (step 62). If the amount of free space is less than a threshold, the disk is spun up (step 66) since write commands received from the host will likely need to be serviced by the disk. If the amount of free space is greater than the threshold, the disk remains spun down (step 64) since write commands received from the host can be serviced by the NVSM.

Figure 4B:
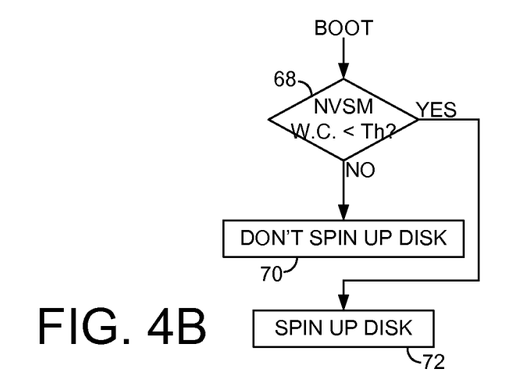
FIG. 4B is a flow diagram according to an embodiment of the present invention wherein the hybrid drive boots in the second mode (and spins up the disk) when the free space in a write cache of the NVSM falls below a threshold.

In another embodiment, the NVSM comprises a write cache for caching write data that is targeted to the disk. For example, at least a portion of the data targeted to the disk may be initially stored in the write cache of the NVSM in order to improve performance, wherein the data is eventually flushed to the disk. In an embodiment shown in the flow diagram of FIG. 4B, at the beginning of a boot operation the control circuitry may evaluate an amount of free space available in the write cache (step 68) to determine whether to spin up the disk (step 72) or keep the disk spun down (step 70). For example, if the amount of free space in the write cache is below a threshold, the disk may be spun up so that the data stored in the write cache can be flushed to the disk.

Figure 4C:
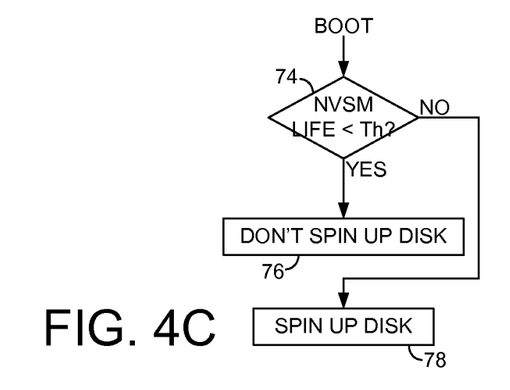
FIG. 4C is a flow diagram according to an embodiment of the present invention wherein the hybrid drive boots in the second mode (and spins up the disk) when a life remaining of the NVSM falls below a threshold.

In one embodiment, the NVSM may have a limited number of program/erase cycles and therefore the NVSM will have an associated life remaining (i.e., number of program/erase cycles remaining). Accordingly, in an embodiment shown in the flow diagram of FIG. 4C, at the beginning of a boot operation the control circuitry may evaluate a life remaining of the NVSM (step 74) to determine whether to spin up the disk (step 78) or keep the disk spun down (step 76). For example, if the NVSM is nearing the end of its life, the control circuitry may spin up the disk during the boot operation since write commands received from the host will likely be serviced using the disk.

Figures 5A, 5B:
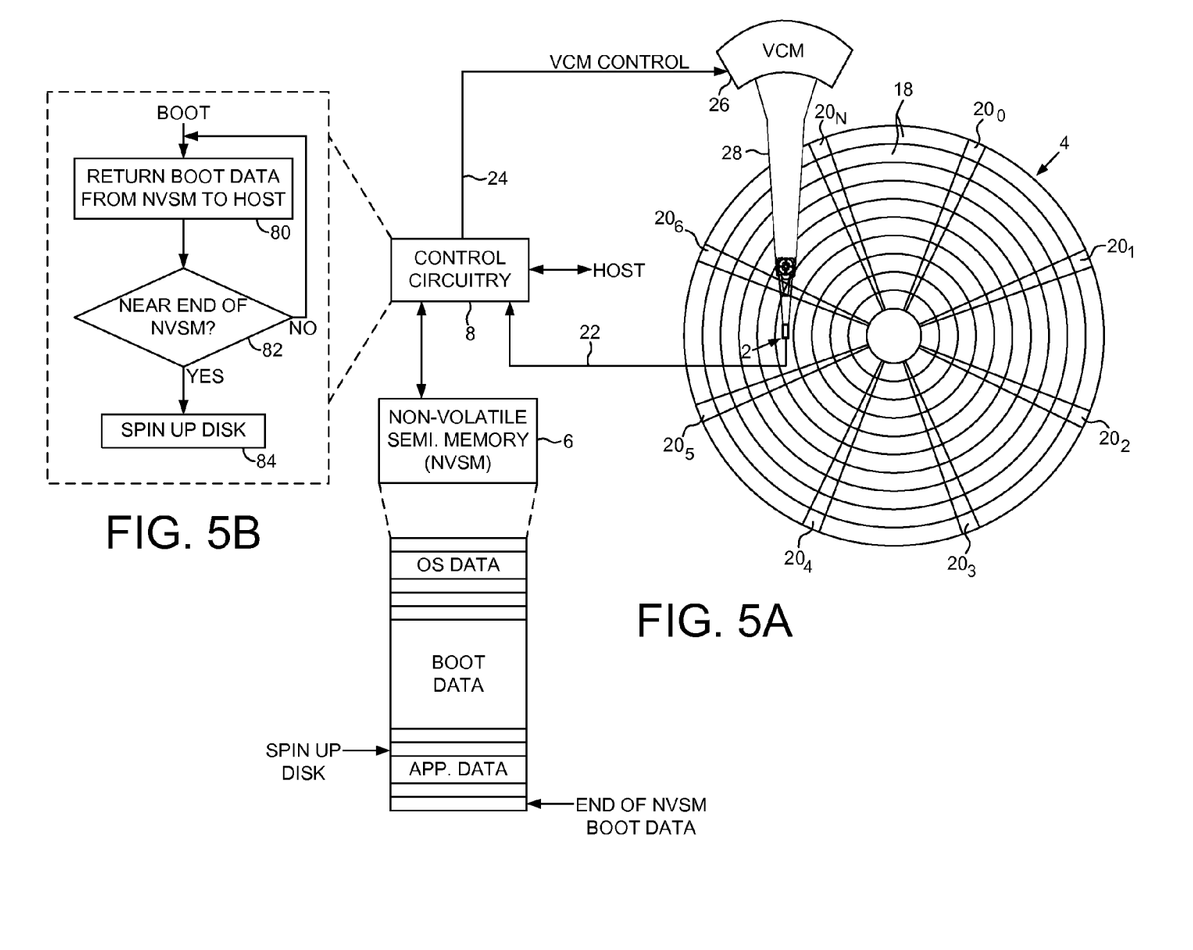
FIGS. 5A and 5B show an embodiment of the present invention wherein the hybrid drive spins up the disk when approaching the end of boot data cached in the NVSM and transferred to a host.

FIGS. 5A and 5B show an embodiment of the present invention wherein boot data for the host is cached in the NVSM 6. The boot data may include operating system data for the host, as well as application data for a user. That is, after a host computer is booted a user will typically launch a number of applications that are commonly used (e.g., calendar, Internet browser, email, etc.). By caching the boot data in the NVSM, when the host is booted the control circuitry of the hybrid drive is able to return the boot data from the NVSM without spinning up the disk. In addition, the control circuitry may return data from the NVSM while a user begins operating a host computer (e.g., by launching and using a repeated sequence of applications). However, at some point a user's operation of the host computer will extend beyond the boot data cached in the NVSM so that read commands will eventually require spinning up the disk. In an embodiment shown in the flow diagram of FIG. 5B, the control circuitry returns the boot data from the NVSM to the host (step 80), and when the user nears the end of the boot data (step 82), the control circuitry spins up the disk in anticipation of servicing read commands using the disk. In one embodiment, nearing the end of the boot data is detected when reaching a literal end of a sequence of data cached in the NVSM as illustrated in FIG. 5A. In an alternative embodiment, nearing the end of the boot data is detected by evaluating the sequence of access commands received from the host relative to a history of access commands received in the past. Nearing the end of the boot data is detected when the sequence of access commands matches a sequence that indicates the user is about to request data that is stored on the disk.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller and/or NVSM controller, or certain steps described above may be performed by a read channel and others by a disk controller and/or NVSM controller. In one embodiment, the read channel and controllers are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the hybrid drive is powered on. In yet another embodiment, the control circuitry comprises suitable logic circuitry, such as state machine circuitry.

What is claimed is:

1. A hybrid drive comprising:
   a disk;
   a head actuated over the disk;
   a non-volatile semiconductor memory (NVSM); and
   control circuitry operable to boot the hybrid drive by:
      transferring boot data from the NVSM to a host; and
      after transferring at least seventy percent of the boot data to the host, begin spinning up the disk prior to receiving an access command from the host to access the disk.

2. A method of operating a hybrid drive comprising a head actuated over a disk, and a non-volatile semiconductor memory (NVSM), the method comprising:
   transferring boot data from the NVSM to a host; and
   after transferring at least seventy percent of the boot data to the host, begin spinning up the disk prior to receiving an access command from the host to access the disk.

3. The hybrid drive as recited in claim 1, wherein the boot data comprises operating system data for the host.

4. The hybrid drive as recited in claim 1, wherein the boot data comprises application data for the host.

5. The method as recited in claim 2, wherein the boot data comprises operating system data for the host.

6. The method as recited in claim 2, wherein the boot data comprises application data for the host.

* * * * *